(12) United States Patent
Yagihashi et al.

(10) Patent No.: US 6,680,107 B2
(45) Date of Patent: Jan. 20, 2004

(54) FILM FORMING COMPOSITION, POROUS FILM AND THEIR PREPARATION

(75) Inventors: Fujio Yagihashi, Gunma-ken (JP); Motoaki Iwabuchi, Gunma-ken (JP); Akira Yamamoto, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/045,160

(22) Filed: Jan. 15, 2002

(65) Prior Publication Data

US 2002/0132908 A1 Sep. 19, 2002

(30) Foreign Application Priority Data

Jan. 15, 2001 (JP) ........................................ 2001-006614

(51) Int. Cl.$^7$ ................ B32B 3/26; C08J 8/26
(52) U.S. Cl. ................... 428/304.4; 427/387; 427/226; 428/447; 525/100
(58) Field of Search .................. 427/226, 387; 428/447, 304.4; 521/77; 525/100

(56) References Cited

U.S. PATENT DOCUMENTS 6,147,156 A * 11/2000 Yamaya et al. ............. 524/806
6,271,273 B1 * 8/2001 You et al. ..................... 521/61
6,399,666 B1 * 6/2002 Hawker et al. ............... 521/77
6,451,436 B1 * 9/2002 Komatsu et al. ............ 428/447

FOREIGN PATENT DOCUMENTS

| JP | A2000-38509 | 2/2000 |
|---|---|---|
| WO | WO 00/61834 | 10/2000 |

* cited by examiner

Primary Examiner—Robert Dawson
Assistant Examiner—Marc S Zimmer
(74) Attorney, Agent, or Firm—Birch, Stewart, Kolasch & Birch, LLP

(57) ABSTRACT

A composition comprising (A) a silanol group-bearing silicone resin comprising 30–100 mol % of T units: $R^1$—$SiZ_3$ and among the entire T units, 30–80 mol % of T-2 units containing only one silanol group: $R^1$—$Si(OH)Z'_2$ wherein $R^1$ is a monovalent hydrocarbon group, Z is OH, hydrolyzable group or siloxane residue, at least one Z being a siloxane residue, and Z' is a siloxane residue, and having a number average molecular weight of at least 100, and (B) a polymer resulting from an acrylate and/or methacrylate monomer is applied to a substrate and heated above the decomposition temperature of polymer (B) to form a porous film. The porous film is flat and uniform despite porosity, and has a low permittivity and high mechanical strength. It is best suited as an interlayer insulating layer when used in semiconductor device fabrication.

8 Claims, No Drawings

FILM FORMING COMPOSITION, POROUS FILM AND THEIR PREPARATION

This invention relates to a film forming composition for forming a porous film having good dielectric properties, adhesion, uniformity and mechanical strength and a method for preparing the same, and a method for forming a porous film as well as the porous film thus formed.

BACKGROUND OF THE INVENTION

As the integration degree of semiconductor integrated circuits increases, an increase of wiring delay time due to an increase of the wiring capacitance which is a parasitic capacitance between metal wiring strips now becomes one factor of preventing the semiconductor integrated circuits from further performance enhancement. The wiring delay time is in proportion to the resistance of metal wiring multiplied by the wiring capacitance and thus also known as RC delay.

To reduce the wiring delay time, the resistance of metal wiring or the wiring capacitance must be reduced.

Once the wiring capacitance is reduced, semiconductor devices can be designed to a higher integration degree without inviting any wiring delay. This enables higher speed operation and minimizes power consumption.

One approach contemplated for reducing the wiring capacitance is to reduce the relative permittivity of an interlayer insulating film formed between metal wiring layers. For the insulating film having a low relative permittivity, the use of porous film instead of conventional silicon oxide film is under study. This is because the porous film is substantially the only one film that can attain a relative permittivity of less than 2.0 and be formed in a practically acceptable manner. Then a number of methods for forming porous films have been proposed.

A first method for forming porous film involves synthesizing a solution of a siloxane polymer precursor containing a thermally unstable organic component, applying the precursor solution to a substrate, and heat treating the coating for decomposing and vaporizing the organic component. After the organic component is volatilized off, a number of pores are left.

In a second method for forming porous film, a wet gel is formed on a substrate by applying a silica sol solution thereto or carrying out chemical vapor deposition (CVD). While volumetric shrinkage is restrained by controlling the evaporation rate of the solvent from the wet gel, condensation reaction is effected on the silica sol, yielding a porous film.

A third method for forming porous film is by applying a solution of silica microparticulates to a substrate, and firing the coating for consolidation, thereby forming a number of pores among silica microparticulates.

A fourth method is given by JP-A 2000-38509 disclosing a porous film-forming composition comprising (A) $R^1{}_n Si(OR^2)_{4-n}$ wherein $R^1$ is a monovalent organic group and n is an integer of 0 to 2, (B) a metal chelate compound and (C) a polymer resulting from polymerization of a monomer in the form of an acrylate or methacrylate.

All these methods have serious drawbacks.

The first porous film forming method adds to the cost because a siloxane polymer precursor solution must be synthesized. When the precursor solution is applied to form a coating, a considerable amount of silanol groups is left in the coating, which gives rise to the degassing phenomenon that moisture will evaporate during the subsequent heat treatment step and the problem that the porous film degrades due to moisture absorption.

The second porous film forming method adds to the cost because a special applicator is needed in order to control the evaporation rate of the solvent from the wet gel. A number of silanol groups are left on surfaces of pores in the film. Without any treatment, the film is so hygroscopic that it may undergo a substantial degradation of quality. It is then necessary to silylate silanol groups on the surface, and so, the process becomes complex. When the wet gel is formed by CVD, a special CVD system different from a plasma CVD system commonly used in the semiconductor technology is needed, which also adds to the cost.

In the third porous film forming method, the pores defined among silica microparticulates have a very large diameter because the pore diameter is geometrically determined by the deposition structure of deposited silica microparticulates. It is then very difficult to form a porous film having a relative permittivity of less than 2.

In the fourth method using a composition comprising components (A), (B) and (C), the metal chelate compound (B) is essential for improving the compatibility between components (A) and (C) and making the thickness of the cured coating uniform, but is undesirable because it invites complication of the composition, complication of the manufacturing process and a cost increase. It would be desirable to have a composition which can form a uniform solution in the absence of a chelate component and afford a flat coating after curing.

SUMMARY OF THE INVENTION

An object of the invention is to provide a film-forming composition which solves the above-mentioned problems and can form a porous film having a relative permittivity of 2.0 or lower through simple steps and at a low cost, and a method for preparing the same. Another object of the invention is to provide a method for forming a porous film and the porous film formed thereby.

Our study on the prior art porous film forming technology has led the knowledge that a silicone component is generally less compatible with an acrylic resin and without any treatment, the silicone is difficult to uniformly mix with the resin.

We made further investigations on such a mixed solution. Even though the solution is apparently clear and uniform, a thin film thereof applied by spin coating becomes whitened or noticeably striated if compatibility is insufficient only a little. In order that a composite material be used in the application contemplated herein, a very high degree of compatibility between components is required.

In the case of a mixed system of silicone resin and acrylic polymer, the prior art failed to prepare a uniform solution using only a silicone resin component and an acrylic resin component. For example, the approach of the above-referred JP-A 2000-38509 uses a metal chelate compound an essential component in addition to the silicone and acrylic components. The disclosure that the chelate component is desirably reacted with both silicone resin and acrylic resin components suggests that a uniform solution can only be formed with the aid of the chelate component, though not definitely described.

The chelate component used to solve the problem are exemplified therein by titanium, zirconium, aluminum, tin, antimony, tantalum, lead, etc. Such a component can trigger an unexpected problem when the related material is applied to semiconductor devices, and leaves some concern about moisture absorption and film degradation.

We have found that the problem can be overcome by controlling the structure of the silicone component. Specifically, a silanol group-bearing silicone resin comprising 30 to 100 mol % of structural units (T units) represented by the formula: $R^1$—$SiZ_3$ and among the entire T units, 30 to 80 mol % of structural units (T-2 units) containing only one silanol group represented by the formula: $R^1$—$Si(OH)Z'_2$ wherein $R^1$, Z and Z' are defined below, and having a number average molecular weight of at least 100 is used and mixed with an acrylic polymer, the resulting mixed system forms a very uniform solution. When the solution is applied and heat cured, a uniform flat coating is formed which is not spotted, whitened or striated.

Furthermore, when the thus formed coating is heated at the decomposition temperature of the acrylic resin component, the curing of the silicone resin component proceeds and at the same time, the acrylic resin component is decomposed whereupon decomposed products vaporize off, leaving pores in the coating. A porous film is eventually obtained. Upon measurement of relative permittivity, this film exhibits a very small value as compared with the relative permittivity inherent to silicone resins. By adjusting the content of the acrylic resin component in the composition, a coating having a desired relative permittivity in the range of about 1.2 to about 2.7 can be formed.

Accordingly, in a first aspect, the invention provides a silicone-containing film forming composition comprising:

(A) a silanol group-bearing silicone resin comprising 30 to 100 mol % of structural units (T units) represented by the general formula (1):

$$R^1\text{—}SiZ_3 \quad (1),$$

and among the entire T units, 30 to 80 mol % of structural units (T-2 units) containing only one silanol group represented by the general formula (2):

$$R^1\text{—}Si(OH)Z'_2 \quad (2),$$

wherein $R^1$ is a substituted or unsubstituted monovalent hydrocarbon group, Z is a hydroxyl group, hydrolyzable group or siloxane residue, at least one of the Z groups being a siloxane residue, and Z' is a siloxane residue, said silicone resin having a number average molecular weight of at least 100, and (B) a polymer resulting from polymerization of a monomer selected from an acrylate, a methacrylate and a mixture thereof.

In another aspect, the invention provides a method for preparing the film forming composition, comprising the steps of mixing (A) a solution in a solvent of the silanol group-bearing silicone resin defined above with (B) a polymerizable monomer selected from an acrylate, a methacrylate and a mixture thereof, or an oligomer thereof, and effecting polymerization in the presence of a radical polymerization catalyst.

In a further aspect, the invention provides a method for forming a porous film comprising the steps of applying the composition defined above to a substrate, and heating the applied composition at a temperature equal to or above the decomposition temperature of component (B). A porous film obtained by the method is also contemplated herein.

DESCRIPTION OF THE PREFERRED EMBODIMENTS

Component (A) used herein is a silanol group-bearing silicone resin comprising 30 to 100 mol % and preferably 60 to 100 mol % of structural units (T units) represented by the general formula (1):

$$R^1\text{—}SiZ_3 \quad (1),$$

and among the entire T units, 30 to 80 mol % and preferably 40 to 70 mol % of structural units (T-2 units) containing only one silanol group represented by the general formula (2):

$$R^1\text{—}Si(OH)Z'_2 \quad (2),$$

wherein $R^1$ is a substituted or unsubstituted monovalent hydrocarbon group, Z is a hydroxyl group, hydrolyzable group or siloxane residue, at least one of the Z groups being a siloxane residue, and Z' is a siloxane residue, and having a number average molecular weight of at least 100.

In the T units of the formula (1): $R^1$—$SiZ_3$ that constitute the silicone resin, $R^1$ stands for substituted or unsubstituted monovalent hydrocarbon groups, preferably of 1 to 12 carbon atoms, for example, alkyl groups, aryl groups, aralkyl groups, alkenyl groups, etc. and substituted ones of the foregoing groups in which some or all of the hydrogen atoms are replaced by halogen atoms (e.g., fluoro) or epoxy-containing groups (e.g., glycidyl and glycidyloxy). Of these, alkyl, aryl and glycidyl groups are typical. Specific examples of the alkyl group are those of 1 to 5 carbon atoms, such as methyl, ethyl, propyl and butyl. These alkyl groups may be straight or branched and have hydrogen atoms substituted with fluorine atoms. Specific examples of the aryl group include phenyl and naphthyl.

Z is a hydroxyl (OH) group, hydrolyzable group or siloxane residue. Illustrative, non-limiting examples of the hydrolyzable groups include alkoxy groups such as methoxy, ethoxy, propoxy, isopropoxy, butoxy, sec-butoxy, and t-butoxy, alkenoxy groups such as vinyloxy and 2-propenoxy, phenoxy groups, acyloxy groups such as acetoxy, oxime groups such as butanoxime, and amino groups. Of these, alkoxy groups are preferred, and methoxy, ethoxy, isopropoxy and butoxy are especially preferred for easy control of hydrolytic condensation. The siloxane residue means a substituent group which bonds to an adjacent silicon atom via an oxygen atom to form a siloxane bond, and thus takes the form of —O—(Si≡). The oxygen atom can also be represented as $O_{1/2}$ because it is shared by adjacent silicon atoms.

In the silicone resin, there are further included 30 to 80 mol % of structural units (T-2 units) containing only one silanol group represented by the formula (2):

$$R^1\text{—}Si(OH)Z'_2 \quad (2)$$

wherein $R^1$ is as defined above and Z is a siloxane residue.

In addition to the T units of formula (1): $R^1$—$SiZ_3$, the silicone resin may contain M units of $R^1_3$—$SiZ$, D units of $R^1_2$—$SiZ_2$, and Q units of $SiZ_4$. Preferably, the silicone resin contains 0 to 30 mol %, especially 0 to 10 mol % of M units, 0 to 50 mol %, especially 0 to 20 mol % of D units, and 0 to 30 mol %, especially 0 to 10 mol % of Q units. Note that at least one of Z in the M, D and Q units should be a siloxane residue.

Reference is now made to the number average molecular weight (Mn) of the silanol group-bearing silicone resin. Where it is desired to apply the composition to form a uniform film, the silicone resin should preferably have a molecular weight above a certain level. For this reason, a silicone resin having a Mn of at least 100 is used in the practice of the invention. An Mn below 100 fails to impart an appropriate structure to form a uniform film and leads to storage instability. The preferred Mn is 500 to 100,000 and especially 1,000 to 5,000.

The silicone resin which can be used herein satisfies the above requirements and should preferably contain at least a certain amount of silanol groups. Specifically, the silicone resin preferably contains at least 5% by weight, and especially 6 to 20% by weight of silanol groups. At too low a silanol group content, the absolute amount of silanol groups contributing to crosslinking becomes short so that the cured coating may have a reduced hardness.

The silanol group-bearing silicone resin may be prepared by any desired method as long as the above requirements are met. Specific preparation methods are described below.

The starting reactant used for preparation may be selected from a variety of silane compounds having functional groups such as alkoxy, alkenyloxy, acyloxy, halogen, amino and oxime groups as the hydrolyzable group, or partial hydrolytic condensates thereof. For easy control of hydrolytic reaction or easy disposal of hydrolytic by-products and from the economic standpoint, it is preferred to use alkoxy groups or chloro atoms, especially alkoxy groups, as the hydrolyzable group. When chloro atoms are used, it is preferred to drive the hydrolysis of chloro atoms to the full extent so that no chloro atoms are left in the silicone resin. The number of hydrolyzable groups per silicon atom may be 1, 2, 3 or 4. Any of silane compounds having organic substituents $R^1$ and satisfying the above requirements can be used as long as the hydrolyzable silane compound in which the number of hydrolyzable groups X is 3, that is, represented by the formula:

$$R^1SiX_3$$

is included in an amount of 30 to 100 mol % and especially 50 to 100 mol % based on the entire hydrolyzable silane compounds. Other hydrolyzable silane compounds which can be used herein are $SiX_4$, $R^1{}_2SiX_2$ and $R^1{}_3SiX$.

Illustrative examples of the silane compound used herein include tetrafunctional silanes (having four hydrolyzable groups): $SiX_4$, such as tetrachlorosilane, tetramethoxysilane, tetraethoxysilane, and tetrabutoxysilane; trifunctional silanes (having three hydrolyzable groups): $R^1SiX_3$, such as methyltrichlorosilane, methyltrimethoxysilane, methyltriethoxysilane, methyltriisopropoxysilane, methyltributoxysilane, methyltriisopropenoxysilane, ethyltrichlorosilane, ethyltrimethoxysilane, propyltrichlorosilane, butyltrichlorosilane, butyltrimethoxysilane, hexyltrichlorosilane, hexyltrimethoxysilane, decyltrichlorosilane, decyltrimethoxysilane, phenyltrichlorosilane, phenyltrimethoxysilane, cyclohexyltrichlorosilane, and cyclohexyltrimethoxysilane; difunctional silanes (having two hydrolyzable groups): $R^1{}_2SiX_2$, such as dimethyldichlorosilane, dimethyldimethoxysilane, dimethyldiethoxysilane, dimethyldiisopropoxysilane, dimethyldibutoxysilane, dimethyldiisopropenoxysilane, propylmethyldichlorosilane, propylmethyldimethoxysilane, hexylmethyldichlorosilane, hexylmethyldimethoxysilane, phenylmethyldichlorosilane, phenylmethyldimethoxysilane, diphenyldichlorosilane, and diphenyldimethoxysilane; monofunctional silanes (having one hydrolyzable group): $R^1{}_3SiX$, such as trimethylchlorosilane, trimethylmethoxysilane, trimethylethoxysilane, trimethylisopropenoxysilane, and dimethylphenylchlorosilane; and silane coupling agents having organic functional groups, such as vinyltrichlorosilane, vinyltrimethoxysilane, vinyltriethoxysilane, 5-hexenyltrimethoxysilane, 3-glycidoxypropyltrimethoxysilane, 3-glycidoxypropyltriethoxysilane, 3-(meth)acryloxypropyltrimethoxysilane, 3-(meth)acryloxypropyltriethoxysilane, 4-vinylphenyltrimethoxysilane, 3-(4-vinylphenyl)propyltrimethoxysilane, 4-vinylphenylmethyltrimethoxysilane, 3-aminopropyltrimethoxysilane, 3-aminopropyltriethoxysilane, 3-(2-aminoethyl)aminopropyltrimethoxysilane, 3-mercaptopropyltrimethoxysilane, 3-mercaptopropyltriethoxysilane, vinylmethyldichlorosilane, vinylmethyldimethoxysilane, vinylmethyldiethoxysilane, 3-glycidoxypropylmethyldimethoxysilane, 3-glycidoxypropylmethyldiethoxysilane, 3-(meth)acryloxypropylmethyldimethoxysilane, 3-(meth)acryloxypropylmethyldiethoxysilane, 3-aminopropylmethyldimethoxysilane, 3-aminopropylmethyldiethoxysilane, 3-mercaptopropylmethyldimethoxysilane, 3-mercaptopropylmethyldiethoxysilane, and partial hydrolyzates thereof.

For ease of operation and distilling off of by-products, use of alkoxysilanes, typically methoxysilanes or ethoxysilanes is more preferred. Of course, the organosilicon compound which can be used herein is not limited to these examples. These silane compounds may be used alone or in admixture of two or more.

The silanol group-bearing silicone resin which can be used herein is characterized in that it is obtained by hydrolyzing the hydrolyzable silane compound, defined and exemplified just above, in an aqueous solution. By effecting hydrolysis under hydrophilic conditions substantially free of an organic solvent, there is obtained a specific silanol group-bearing silicone resin which is highly structured and contains a significant amount of T-2 units. This silicone resin is preferably prepared by the following steps.

A first step is to subject a hydrolyzable organic silane compound as mentioned above to hydrolytic condensation in an aqueous solution at pH 1 to 7. The amount of water used for hydrolysis may be about 50 to 5,000 parts by weight per 100 parts by weight of the silane compound or mixture thereof formulated to a composition satisfying the above requirements. Less than 50 parts means a too small amount of water in the reaction system so that it is difficult to control the reactivity of silanol groups, failing to impart a specific structure. More than 5,000 parts of water reduces the concentration of the silane reactant too low and may retard condensation reaction.

Hydrolysis is carried out by adding the silane compound to an aqueous solution, followed by agitation. A hydrolytic catalyst may be added to promote hydrolysis, especially at the initial. The hydrolytic catalyst may be added to either the aqueous solution prior to the addition of the silane compound or the dispersion having the silane compound dispersed therein. A suitable hydrolytic catalyst is selected from conventional well-known catalysts, preferably those catalysts which exhibit an acidity of pH 1 to 7 when added to an aqueous solution. Preferred catalysts are acidic hydrogen halides, carboxylic acids, sulfonic acids, acidic or weakly acidic inorganic salts, and solid acids such as ion exchange resins. Illustrative examples are mineral acids such as hydrofluoric acid, hydrochloric acid, nitric acid and sulfuric acid, organic acids such as acetic acid, maleic acid and trifluoroacetic acid, sulfonic acids such as methanesulfonic acid, p-toluenesulfonic acid and trifluoromethanesulfonic acid, and cation exchange resins having sulfonic acid or carboxylic acid groups on the surface.

The amount of the hydrolytic catalyst, if used, is preferably in a range of 0.001 to 10 mol % based on the moles of hydrolyzable groups on silicon atoms. Under strongly acidic conditions below pH 1 or under alkaline conditions above pH 7, silanol groups tend to become quite unstable. More preferably, the aqueous solution is adjusted to pH 2 to 6. The amount of water is in large excess relative to the amount of hydrolyzable groups, and so hydrolysis proceeds to completion. As the solution is agitated under the above conditions and at room temperature or elevated temperature, condensation readily takes place between silanol groups. At this stage, hydrolytic by-products are present in the system, and the silane reaction mixture serving as a precursor of the desired silanol group-bearing silicone resin is kept dissolved in the solution.

A second step is to remove the hydrolytic by-products from the solution of the reaction mixture for yielding a system consisting essentially of the desired silanol group-bearing silicone resin and water. Specifically, the solution containing the silane reaction mixture resulting from the first step is heated at a temperature below about 80° C., especially about 30 to 70° C. under atmospheric pressure, or kept or heated at a temperature in the range from room temperature to about 80° C., preferably from room temperature to about 70° C. under a pressure in the range from 20 mmHg to atmospheric pressure, whereby the hydrolytic by-products such as alcohols are distilled off. In this way, the system is converted into a system consisting essentially of the desired silanol group-bearing silicone resin and water. During the step, the silicone resin further increases its degree of condensation. The silicone resin, which has undergone hydrolytic condensation to some extent in the first step, converts to a higher molecular weight one and gradually loses hydrophilicity with the progress of condensation. As the same time, the external environment in which the silicone resin is dissolved becomes almost water.

Upon removal of 30 to 100% of the hydrolytic by-products formed, the silanol group-bearing silicone resin cannot keep dissolved in the solution, and so the solution becomes faintly or white turbid. The more preferred amount of the hydrolytic by-products removed is 50 to 100%. Now that the silicone resin has turned to be insoluble in the water layer, it settles down when allowed to stand.

The silicone resin which has separated from the aqueous layer in this way can be directly taken out. Alternatively, an organic solvent which is not uniformly miscible with water is added to the system for dissolving the silicone resin therein, whereby the silicone resin is separated in solution form from the aqueous layer. Examples of the organic solvent include diethyl ether, diisopropyl ether, methyl isobutyl ketone, ethyl acetate, n-butyl acetate, isobutyl acetate, benzene, toluene and xylene.

In this way, there is obtainable the silicone resin which can be used herein. Any of silicone resins which are obtained by various preparation methods can be used herein as long as they fall in the above-defined range. Namely, the silicone resin is not limited to a specific preparation method.

Described below is the polymer (B) resulting from polymerization of a monomer selected from an acrylic ester, a methacrylic ester and a mixture thereof.

Examples of the acrylate and methacrylate of which the inventive polymer is constructed include alkyl acrylates, alkyl methacrylates, alkoxyalkyl acrylates, and alkykoxyalkyl methacrylates. Typical of the alkyl acrylates are esters of alkyl having 1 to 6 carbon atoms, such as methyl acrylate, ethyl acrylate, n-propyl acrylate, isopropyl acrylate, n-butyl acrylate, isobutyl acrylate, pentyl acrylate, and hexyl acrylate. Typical of the alkyl methacrylates are esters of alkyl having 1 to 6 carbon atoms, such as methyl methacrylate, ethyl methacrylate, n-propyl methacrylate, isopropyl methacrylate, n-butyl methacrylate, isobutyl methacrylate, t-butyl methacrylate, pentyl methacrylate, and hexyl methacrylate. Exemplary alkoxyalkyl acrylates are methoxymethyl acrylate and ethoxyethyl acrylate. Exemplary alkoxyalkyl methacrylates are methoxymethyl methacrylate and ethoxyethyl methacrylate. Of these, alkyl methacrylates are preferably used, with methyl methacrylate, ethyl methacrylate and isobutyl methacrylate being especially preferred.

In the practice of the invention, the acrylic polymer is preferably formed by copolymerizing the above monomer with a monomer having an alkoxysilyl group. Examples of the monomer having an alkoxysilyl group include 3-(trimethoxysilyl)propyl acrylate, 3-(triethoxysilyl)propyl acrylate, 3-[tri(methoxyethoxy)silyl]propyl acrylate, 3-(methyldimethoxysilyl)propyl acrylate, 3-(methyldiethoxysilyl)propyl acrylate, 3-(trimethoxysilyl)propyl methacrylate, 3-(triethoxysilyl)propyl methacrylate, 3-[tri(methoxyethoxy)-silyl]propyl methacrylate, 3-(methyldimethoxysilyl)propyl methacrylate, and 3-(methyldiethoxysilyl)propyl methacrylate. The alkoxysilyl group-bearing monomer is preferably used in an amount of 0.5 to 10 mol % and especially 1 to 7 mol % of the entire monomers of which the acrylic polymer is constructed.

In the acrylic polymer used herein, a radical polymerizable monomer other than the acrylate, the methacrylate and the alkoxysilyl group-bearing monomer can be copolymerized in an amount of up to 40 mol %. Such radical polymerizable monomers include unsaturated carboxylic acids such as acrylic acid and methacrylic acid, unsaturated amides such as N,N-dimethylacrylamide and N,N-dimethylmethacrylamide, unsaturated nitrites such as acrylonitrile, unsaturated ketones such as methyl vinyl ketone, and aromatic compounds such as styrene and α-methylstyrene.

The acrylic polymer should preferably have a number average molecular weight of 1,000 to 100,000, and especially 1,000 to 20,000, as calculated on a polystyrene basis. The mixing proportion of components (A) and (B) is preferably from 5:95 to 95:5, and especially from 10:90 to 80:20 in a weight ratio.

In one embodiment, the acrylic polymer is prepared by mixing the corresponding monomer(s) with the silicone resin component, and subjecting the mixture, dissolved in a solvent, to polymerization reaction whereby a composition within the scope of the invention is obtainable. Where this procedure is employed, the monomer(s) are polymerized in the presence of the silicone resin so that both the resins form an interpenetrating polymer network (IPN). As a consequence, the mixture of the methyl silicone resin and the acrylic polymer which are otherwise less dissolvable in each other affords a solution which is extremely high in uniformity as compared with conventional mixtures of silicone resins and acrylic resins, so that the solution is completely clear and does not undergo separation or spotting even after coating.

The coating solution used herein is one in which the silicone resin and the acrylic polymer are dissolved in a solvent. The solvent used herein is selected from conventional solvents used as coating aids as long as the silicone resin and the acrylic polymer can be dissolved therein. Exemplary, non-limiting, solvents include methyl isobutyl ketone, butyl acetate, isobutyl acetate, ethyl lactate, cyclohexanone, diglyme, ethyl cellosolve acetate, propylene glycol monomethyl ether acetate, and anisole.

A surfactant may be added to the coating solution for the purpose of improving the flatness of a coating thereof.

In forming a porous film using the film forming composition of the invention, the composition is first applied to a substrate to form a coating. Examples of the substrate to which the composition is applicable include semiconductors, glass, ceramics and metals. Any desired application technique used in conventional semiconductor device fabrication is acceptable. Typical application techniques are spin coating, dipping and roller blade coating. The coating usually has a thickness of 0.2 to 20 µm when it is an interlayer insulating film. The coating is then heated. This heating step, also known as prebaking, intends to evaporate the solvent in the coating solution for fixing the shape of the coating. The heating temperature is sufficient for the solvent in the coating solution to evaporate.

The coating thus formed is heated at such a temperature that component (A) may cure and component (B) decompose and vaporize whereby a cured film having pores is obtained. This heating step is to heat at a temperature of 300 to 500° C. whereby the coating converts to a porous film containing a number of pores when the inventive composition is used. The heating time is usually about 1 minute to about 2 hours, and preferably about 5 minutes to about 1 hour. At too low a heating temperature, the curing of component (A) and the decomposition and vaporization of component (B) do not proceed, and the resulting film has low mechanical strength due to under curing. Too high a heating temperature induces excessive decomposition, resulting in a decline of film strength as well. Such a high temperature is sometimes unacceptable in the semiconductor device manufacture process. The preferred temperature is 350 to 450° C.

With respect to the atmosphere during the heating step, the distribution of pores in the film and the mechanical strength differ between heating in air and heating in inert gas. The physical properties of the film can be controlled by selecting the heating atmosphere. The heating atmosphere is not critical and any desired heating atmosphere is employable. Exemplary of the inert gas are nitrogen and argon gases. Preferably the inert gas is used so as to provide an oxygen concentration of 5 ppm or lower. By heating in such an inert gas atmosphere, the film can be endowed with a lower permittivity because the influence of oxygen is avoided.

In the method of forming a porous film according to the invention, when the film forming composition is heated (or reacted) in vacuum, the permittivity of the film can be further reduced due to the eliminated influence of oxygen.

The porous film obtained by heating the inventive composition according to the inventive method generally has pores with a size of 100 nm or less and a void content of 5 to 70%. The film generally has a permittivity of 2.7 to 1.2, preferably 2.5 to 1.2, and more preferably 2.2 to 1.2. The film of the invention is useful as an insulating film, and especially an interlayer insulating film in highly integrated circuits.

EXAMPLE

Examples of the invention are given below by way of illustration and not by way of limitation. It is noted that Mn is number average molecular weight and Mw is weight average molecular weight.

Preparation Example 1

A 2-liter flask was charged with 408 g (3.0 mol) of methyltrimethoxysilane. In a nitrogen atmosphere and at 0° C., 800 g of water was added and thoroughly mixed. Under ice cooling, 216 g of a 0.05N aqueous hydrochloric acid solution was added dropwise over 40 minutes to the mixture for hydrolytic reaction. At the end of dropwise addition, the mixture was stirred for one hour below 10° C. and for a further 3 hours at room temperature to drive the hydrolytic reaction to completion. Thereafter, methanol resulting from hydrolysis and water were distilled off in vacuum for one hour under conditions of 70° C. and 60 Torr, yielding 1,136 g of a solution. The solution looked white turbid and after allowing to stand for one day, separated into two layers. That is, the silicone resin which turned to be insoluble in water settled down. To the white turbid solution, 200 g of methyl isobutyl ketone was added and thoroughly agitated. The solution was allowed to stand whereupon the resin was separated from the aqueous layer. There was obtained 398 g of the methyl isobutyl ketone solution. On $^{29}$NMR analysis, the silanol group-bearing silicone resin was found to consist of 100 mol % of T units, which in turn, consisted of 2 mol % of T-1 units, 42 mol % of T-2 units, and 56 mol % of T-3 units. The silicone resin had a Mn of 1,800. Note that the T-1 units are $CH_3Si(OH)_2Z'$, the T-2 units are $CH_3Si(OH)Z'_2$, and the T-3 units are $CH_3SiZ'_3$.

Preparation Example 2

Reaction was carried out as in Preparation Example 1 except that the 2-liter flask was charged with 367 g of methyltrimethoxysilane and 41 g of dimethyldimethoxysilane. There was obtained 412 g of the methyl isobutyl ketone solution. On GPC analysis using a polystyrene standard, the resin had a Mn of 2,100. The silicone resin was found to consist of 89 mol % of T units and 11 mol % of D units, and the T units consisted of 4 mol % of T-1 units, 40 mol % of T-2 units, and 56 mol % of T-3 units. The T-1, T-2 and T-3 units are as defined above.

Preparation Example 3

A 100-ml flask was charged with 17.95 g of ethyl methacrylate, 2.05 g of 3-(trimethoxysilyl)propyl methacrylate, 0.33 g of AIBN, 0.20 g of 2-mercaptoethanol, and 30 g of 3-methoxymethyl propionate, which are stirred for dissolution. After the system was purged with nitrogen gas, it was stirred for 7 hours while heating in an oil bath at 80° C. A viscous polymer solution was obtained. On GPC analysis using a polystyrene standard, the resin had a Mn of 5,200.

Preparation Example 4

A 100-ml flask was charged with 19.0 g of isobutyl methacrylate, 1.0 g of 3-(trimethoxysilyl)propyl methacrylate, 0.33 g of AIBN, 0.20 g of 2-mercaptoethanol, and 30 g of methyl isobutyl ketone, which are stirred for dissolution. After the system was purged with nitrogen gas, it was stirred for 7 hours while heating in an oil bath at 80° C. A viscous polymer solution was obtained. On GPC analysis using a polystyrene standard, the resin had a Mn of 52,000.

Preparation Example 5

A 2-liter flask was charged with 498 g of the solution obtained in Preparation Example 1, 37.8 g of methyl methacrylate (MMA), 16.2 g of butyl acrylate (BA) and 1.0 g of 3-(triethoxysilyl)propyl methacrylate, which were thoroughly agitated. After the system was purged with nitrogen gas, it was heated at 95° C. and a solution of 1 g AIBN in 10 ml methyl isobutyl ketone was added over 2 hours. The reaction solution was kept at the temperature for 3 hours, yielding a viscous solution. On GPC analysis using a polystyrene standard, the resin had a Mn of 7,890 and a Mw of 14,300.

Preparation Example 6

A 2-liter flask was charged with 500 g of the silicone resin obtained in Preparation Example 2, 37.8 g of ethyl methacrylate, 16.2 g of hexyl acrylate and 1.0 g of 3-(methyldiethoxysilyl)propyl methacrylate. Reaction was carried out as in Preparation Example 5. The product had an average molecular weight of 19,500 on a polystyrene basis.

Examples and Comparative Examples

A coating solution containing the components shown in Table 1 was spin coated onto a substrate and heat treated to form a porous film, which was evaluated. More particularly, the coating solution was optionally diluted with propylene glycol monomethyl ether acetate to give a solution having a non-volatile content of 30 to 40% before it was spin coated. The spin coating was carried out at 1,500 to 3,000 rpm for 60 seconds. The coating was prebaked at 100° C. for 60 seconds and then heated in air in an oven at 400° C. for 60 minutes. The permittivity of the coating was measured at a frequency of 100 kHz using HP16451B electrodes and HP4284A precision LCR meter by Hewlett Packard Yokokawa Co., Ltd. The results are shown in Table 1.

TABLE 1

| Component (A) | Component (B) | Mixing ratio (by weight) | Flatness | Refractive index | Permittivity |
|---|---|---|---|---|---|
| CE1 | PE1 | — | 100:0 | Good | 1.383 | 2.5 |
| EX1 | PE1 | PE3 | 72:28 | Good | 1.303 | 2.2 |
| EX2 | PE1 | PE3 | 43:57 | Good | 1.267 | 1.8 |
| EX3 | PE6 | — | | Good | 1.265 | 1.9 |
| EX4 | PE1 | PE4 | 43:57 | Good | 1.265 | 1.8 |
| EX5 | PE1 | PE5 | 43:57 | Good | 1.266 | 1.9 |
| EX6 | PE2 | PE3 | 43:57 | Good | 1.265 | 1.9 |

Note that the flatness of a film is examined in two ratings of Good and Poor. Under the heading "component," PE is an abbreviation of Preparation Example.

Using a composition comprising a silanol group-bearing silicone resin and a (meth)acrylic polymer according to the invention, a porous film can be formed which is flat and uniform despite porosity, and has a low permittivity and high mechanical strength. The film is best suited as an interlayer insulating layer when used in semiconductor device fabrication.

Japanese Patent Application No. 2001-006614 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for forming a porous film comprising the steps of:

applying a silicone-containing film forming composition to a substrate, and heating the applied composition at a temperature at least equal to the decomposition temperature of component (B), said silicone-containing film forming composition comprising:

(A) a silanol group-bearing silicone resin comprising 30 to 100 mol % of structural units (T units) represented by the general formula (1):

$$R^1\!\!-\!\!SiZ_3 \qquad (1)$$

and among the entire T units, 30 to 80 mol % of structural units (T-2 units) containing only one silanol group represented by the general formula (2):

$$R^1\!\!-\!\!Si(OH)Z'_2 \qquad (2)$$

wherein $R^1$ is a substituted or unsubstituted monovalent hydrocarbon group, Z is a hydroxyl group, hydrolyzable group or siloxane residue, at least one of the Z groups being a siloxane residue, and Z' is a siloxane residue, said silicone resin having a number average molecular weight of at least 100, and (B) a polymer resulting from polymerization of a monomer selected from an acrylate, a methacrylate and a mixture thereof.

2. A porous film obtained by the method of claim 1.

3. The method of claim 1 wherein the silicone resin has a number average molecular weight of at least 100.

4. The method of claim 1 wherein the silicone resin contains at least 5% by weight of silanol groups.

5. The method of claim 1 wherein the heating is conducted at a temperature of from 300° C. to 500° C.

6. The method of claim 1 wherein the heating is conducted in air.

7. The method of claim 1 wherein the heating is conducted in an inert gas.

8. The method of claim 1 wherein the porous film has pores of a size of 100 nm or less.

* * * * *